Figure 1:
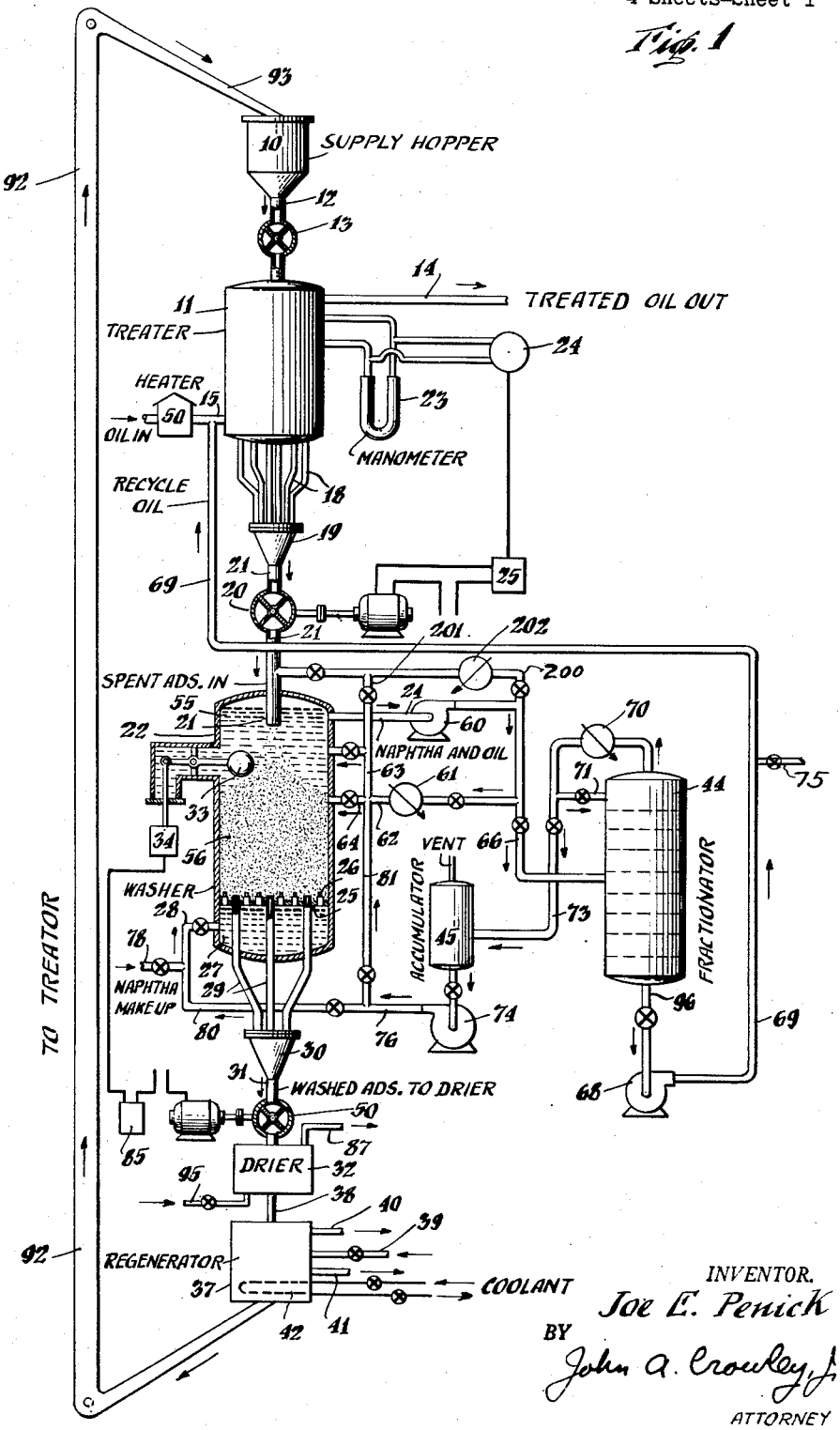

Nov. 20, 1956

J. E. PENICK 2,771,407

CONTINUOUS PERCOLATION PROCESS

Filed Nov. 19, 1952

4 Sheets-Sheet 2

INVENTOR.
Joe E. Penick
BY
John A. Crowley Jr.
ATTORNEY

Nov. 20, 1956 J. E. PENICK 2,771,407
CONTINUOUS PERCOLATION PROCESS
Filed Nov. 19, 1952 4 Sheets-Sheet 3

INVENTOR.
Joe E. Penick
BY
John A. Crowley, Jr.
ATTORNEY

Nov. 20, 1956 J. E. PENICK 2,771,407
CONTINUOUS PERCOLATION PROCESS
Filed Nov. 19, 1952 4 Sheets-Sheet 4

INVENTOR.
Joe E. Penick
BY
John A. Crowley, Jr.
ATTORNEY.

United States Patent Office 2,771,407
Patented Nov. 20, 1956

2,771,407

CONTINUOUS PERCOLATION PROCESS

Joe E. Penick, Augusta, Kans., assignor to Socony Mobil Oil Company, Inc., a corporation of New York Application November 19, 1952, Serial No. 321,373

15 Claims. (Cl. 196—147)

This invention relates to a process for treating liquid hydrocarbons and mineral oils, particularly lubricating oils and lower boiling petroleum fractions with solid adsorbents, for the purpose of removing small amounts of impurities or undesirable contaminants therefrom. It is particularly concerned with a method for washing spent adsorbents after use in such treating processes and prior to regeneration thereof.

Typical of the oil treating processes with which this invention is concerned are decolorization, neutralization, removal of suspended colloidal or dissolved impurities such as carbon or coke or oxygen and nitrogen containing compounds and other gum forming compounds and improvement of demulsibility properties of mineral oils. Other processes may include separation of liquid hydrocarbons by adsorption, solvent extraction and the like.

Recently, there has been developed a continuous percolation method which is applicable to processes of the kind mentioned above. In the continuous percolation process an adsorbent of palpable particulate form is caused to move downwardly as a columnar mass through a confined treating zone countercurrently to the liquid hydrocarbons being treated. A carbonaceous contaminant is deposited on the adsorbent which reduces its treating efficiency. This contaminant is comprised chiefly of hydrocarbonaceous material but may also include small amounts of oxidized hydrocarbons and sulfur and nitrogen compounds. Also where the process involves oil decolorization, color bodies may form a portion of the contaminant deposit. As the adsorbent is withdrawn from the treating zone a substantial amount of cycle oil is withdrawn along with the spent adsorbent stream. This cycle oil includes oil contained in the pores of the adsorbent, oil filling the void spaces between adsorbent granules in the spent adsorbent discharge stream and a certain amount of supernatant oil which flows with, but faster than, the adsorbent granules in the discharge stream. The supernantant oil and the oil between the pores may be drained off from the adsorbent and the adsorbent may then be subjected to washing with a solvent for the purpose of recovering all of the remaining oil prior to regeneration of the adsorbent by drying and combustion of contaminant. Alternatively the spent adsorbent stream including oil in pores, voids and supernatant oil may be passed directly from the treating zone to a washing step for recovery of the total cycle oil from the adsorbent. All of the cycle oil is separated from the wash solvent by fractionation and is then passed to storage or more desirably recycled to the treater. This process is the subject of claims in application Serial Number 428,694, filed in the United States Patent Office on May 10, 1954, and United States Patent 2,701,786 issued February 8, 1955. The term "cycle oil" shall be used herein unless otherwise indicated both in describing and claiming this invention in a sense as broadly covering the sum total of the oil discharged from the treater in the adsorbent pores, in the voids between granules in the discharge stream and the supernatant oil or any one or more of them.

While the continuous percolation process is applicable to treating operations conducted at ordinary atmospheric or relatively low temperatures, it has been found desirable and in some cases essential to conduct treating operations on many oil feed stocks at elevated temperatures. The present invention is particularly concerned with operations of this latter type.

It has been found that cycle oil may be effectively removed from spent adsorbents by passing the adsorbent downwardly through a washing zone as an elongated columnar mass while passing a suitable washing solvent upwardly through the mass. However, such operations involve problems in the accomplishment of a separation between the solvent and the adsorbent in the upper portion of the washer without entrainment of the adsorbent particles. The separation step becomes particularly troublesome when the adsorbent enters the washer at an elevated treating temperature which often may exceed the boiling point of the solvent, thereby causing excessive vaporization of the solvent. This vaporization seriously interferes with disengagement of the adsorbent from the liquid in the upper portion of the washer and excessive entrainment of the adsorbent in the effluent solvent-oil stream results.

Also in such operations the hot spent adsorbent from the treating zone may enter the washer at temperatures which often may exceed a level at which color bodies on the adsorbent are removed therefrom in substantial amounts by the solvent. When the color bodies are removed from the adsorbent due to high temperature levels in the washer, they eventually turn up in the recovered oil upon fractionation thereof from the solvent. This usually results in a recovered oil having a color substantially darker than the original oil feed to the treater, whereas without removal of the color bodies from the adsorbent, the recovered oil in the continuous percolation process would have a color not substantially darker and usually somewhat lighter than the original feed to the treater. This contamination of the recovered oil due to high washing temperatures is undesirable even where the recovered oil is withdrawn to storage if permitted to proceed too far. When the recovered oil is recycled, it may constitute a very substantial portion of the total oil feed to the treater and the recycling of oil having a color very substantially darker than the fresh oil feed can result in greatly decreased yields of decolorized oil from the top of the treater. In some cases when the washer temperature is too high the recovered oil color may be so dark as to render its recycling to the treater entirely unfeasible. This is particularly true in the case of decolorizing operations conducted on oil feeds initially containing large amounts of color bodies.

A major object of this invention is the provision of an improved continuous cyclic process for treating hydrocarbon charges at elevated temperatures with a moving adsorbent of palpable particulate form for the purpose of removing undesired components from the hydrocarbon charge which process overcomes the above mentioned difficulties.

Another object of this invention is the provision of an improved continuous cyclic percolation process for decolorization of mineral oils at elevated temperatures by means of a moving adsorbent and for regenerating the adsorbent without substantial loss of oil.

Another object is the provision in a continuous cyclic process for treatment of mineral oils with adsorbents of palpable particulate form at elevated temperatures of an improved method for washing cycle oil from the spent adsorbent.

A specific object is the provision in a cyclic process for decolorization of mineral oils at elevated temperatures of an improved method for solvent washing cycle oil from the spent adsorbent without substantial entrainment thereof in the solvent.

Another specific object is the provision in an oil decolorizing process of a method for washing cycle oil from a spent adsorbent bearing cycle oil, color bodies and carbonaceous contaminants without dissolving amounts of color bodies from the adsorbent in the wash solvent sufficient to cause excessive reduction in the amount of decolorized oil product obtainable per unit of adsorbent throughput in the decolorizing zone of the process.

These and other objects of the invention will become apparent from the following description thereof.

In a broad aspect this invention involves an improvement in a continuous cyclic process for treating a hydrocarbon charge with a moving adsorbent wherein the hydrocarbon charge is passed upwardly through a columnar mass of gravitating adsorbent in a confined treating zone at a rate and elevated temperature suitable for effecting removal of certain undesired or selected components from the charge, the treated oil being withdrawn from the upper section of the treating zone and the spent adsorbent bearing the removed components and a substantial amount of cycle hydrocarbons corresponding approximately to the original charge being withdrawn from the lower section of the treating zone still at or near the elevated treating temperature level. The hot spent adsorbent is passed through a cooling zone wherein it is cooled to a temperature substantially below the elevated treating temperature and the cooled adsorbent is then passed ownwardly through a washing zone through at least a substantial portion of which the adsorbent flows as a columnar mass. A suitable washing solvent is passed upwardly through the columnar mass at a temperature suitable for removing the cycle hydrocarbons from the adsorbent but insufficient to remove excessive amounts of the undesired components which were removed from the original charge in the treating zone. The mixture of solvent and removed hydrocarbons is withdrawn from the upper section of the washing zone and subjected to fractionation to obtain a hydrocarbon recycle stock in which the percentage of the undesired components is preferably not substantially higher than in the original charge to the treating zone and in any event below that which cause excessive loss in treated oil yield of specified purity per unit of adsorbent throughput in the treating zone. This recyle stock is recycled to the treating zone for treatment therein and ultimate recovery as treated product. The washed adsorbent bearing some entrained solvent and the undesired components is subjected to drying, regeneration by burning and cooling after which it is recycled to the treating zone for reuse therein. The invention is particularly applicable to processes for decolorizing of mineral oils where the undesired components comprise color bodies and gum forming compounds and the like and where the spent adsorbent initialy exists at elevated temperatures high enough, if maintained in the washer to cause resolution of the color bodies from the adsorbent in excessive amounts or at least to cause boiling of the wash solvent. In the latter case, the adsorbent is cooled sufficiently either to prevent vaporization of the solvent entirely or at least to limit vaporization below an amount which would cause substantial entrainment of the adsorbent in the effluent wash solvent.

In one aspect, this invention deals particularly with a method for washing hot spent adsorbents from continuous treating processes of the type above mentioned wherein a columnar mass of the adsorbent is maintained in the lower portion of a washing zone and a suitable washing solvent is pased upwardly therethrough to remove cycle oil and the cycle oil and solvent is passed upwardly from the surface of the columnar mass into a liquid body thereof maintained above the columnar mass. The mixed oil and solvent is withdrawn from the upper section of the liquid body. Hot spent adsorbent, existing initially at temperatures above the boiling point of the wash solvent or so high as to cause resolution of excessive amounts of the color bodies upon extended contact of the adsorbent with the solvent or both, is passed downwardly through a confined tube or passage extending from a level above the surface of the liquid body and terminating below the surface thereof. A portion of at least the solvent constituent of the mixed liquid withdrawn from the liquid body is injected downwardly into the confined passage to cool the adsorbent to a temperature below those at which excessive amounts of color bodies would be redissolved by the solvent in the washing zone or to a temperature below the boiling point of the solvent or preferably both. The cooled adsorbent drops freely from the lower end of the cooling passage onto the surface of the columnar mass thereof in the washing zone.

In still another aspect of the invention, cool solvent or a mixture of the solvent and recovered oil from the washing zone is injected into the stream of hot spent adsorbent passing from the decolorizing zone to the washing zone to cool the adsorbent before it reaches the columnar mass in the washing zone to a temperature below the boiling range of the solvent but still sufficiently high to cause removal of substantial amounts of color bodies from the adsorbent in the washing zone. The adsorbent is further cooled as it passes downwardly in the columnar mass in the washing zone to provide a temperature range along the washing zone below that at which substantial amounts of color bodies are removed from the adsorbent by controlling the temperature and rate of solvent introduction into the lower section of the washing zone.

In another respect, the invention involves a continuous process for decolorization of mineral oils in which the mineral oil is passed upwardly through a columnar mass of gravitating adsorbent of palpable particulate form. In order to provide a practical rate of oil throughput without disruption of the columnar mass of adsorbent, the treating is conducted at an elevated temperature. The spent adsorbent still at or near the treating temperature level is passed to a washing zone for the purpose of washing therefrom cycle mineral oil. The adsorbent enters the washing zone still at or near the treating temperature, which exceeds the boiling point of the wash solvent employed in the washing zone. The spent adsorbent passes downwardly through and in heat exchange relationship with a liquid body of the wash solvent containing removed oil maintained in an upper portion of the washing zone, whereby the adsorbent is cooled to a temperature substantially below the elevated treating temperature. The cooled adsorbent then drops onto a columnar mass thereof maintained below the liquid body and passes downwardly through the columnar mass countercurrently to a stream of upwardly flowing solvent. The cycle oil is thereby removed by the solvent while the color bodies and carbonaceous contaminant are left on the adsorbent. The solvent and removed oil pass upwardly from the surface of the columnar mass into and through the liquid body and are removed substantially free of adsorbent from the upper section of the liquid body. The liquid body is subjected to heat extraction either by means of indirect heat transfer with a cooling fluid or by means of recycling cooled solvent or solvent and oil thereto so that vaporization of the solvent is either entirely prevented or is at least limited below an amount which would cause substantial entrainment of the adsorbent in the effluent wash solvent. The washed adsorbent is withdrawn from the lower section of the washing zone and the color bodies and carbonaceous contaminant are removed therefrom by drying and burning at elevated temperatures. The regenerated adsorbent is cooled to the suitable elevated treating temperature and recycled to the treating zone for reuse therein.

In conducting this invention the adsorbent employed should be made up of palpable particles of size within the range about 4–100 mesh and preferably about 10–60 and still more preferably 15–30 mesh by Tyler Standard Screen Analysis. The particles may take the form of pellets, capsules, pills, spheres or the like or granules of irregular shape such as are obtained from grinding and screening. The terms adsorbent in palpable particulate form and palpable particle form adsorbents as employed herein in describing and in claiming this invention are intended to generically cover particles of any or all of these shapes having substantial size as distinguished from finely divided particles. The pore structure of the preferred adsorbents are such that while micropores are present, substantially more than 30 percent of the pore volume and preferably more than 60 percent of the total pore volume is occupied by macropores (i. e. pores having radii greater than 100 angstrom units). Typical adsorbents which may be employed are fuller's earth, bauxite, bentonite and bone char, charcoal, magnesium silicate, heat and acid activated kaolin, and activated carbon. Synthetic silica or alumina or silica-alumina gel adsorbents and the like may be employed but preferably the preparation thereof should be controlled to provide a pore structure similar to that of the clay type adsorbents wherein substantially more than 30 percent of the total pore volume is occupied by macropores. Gels of this type are described in United States Patent 2,188,007, issued January 23, 1940. It should be understood, however, that by proper control of the operation conditions, adsorbents of the synthetic gel type or otherwise having mostly micropores and less than 30 percent macropores may be employed in the process of this invention although with somewhat inferior results when used for lubricating oil purification. On the other hand, gels of this latter type have been found to give superior results in the treatment of distillate fuel oils by the method of this invention. Such adsorbents of this latter type are disclosed in United States Patents 2,384,946 and 2,106,744. The invention in its broadest form is intended to be applicable to adsorbents of this type as well as the preferred adsorbents of larger pore structure.

Figure 2:
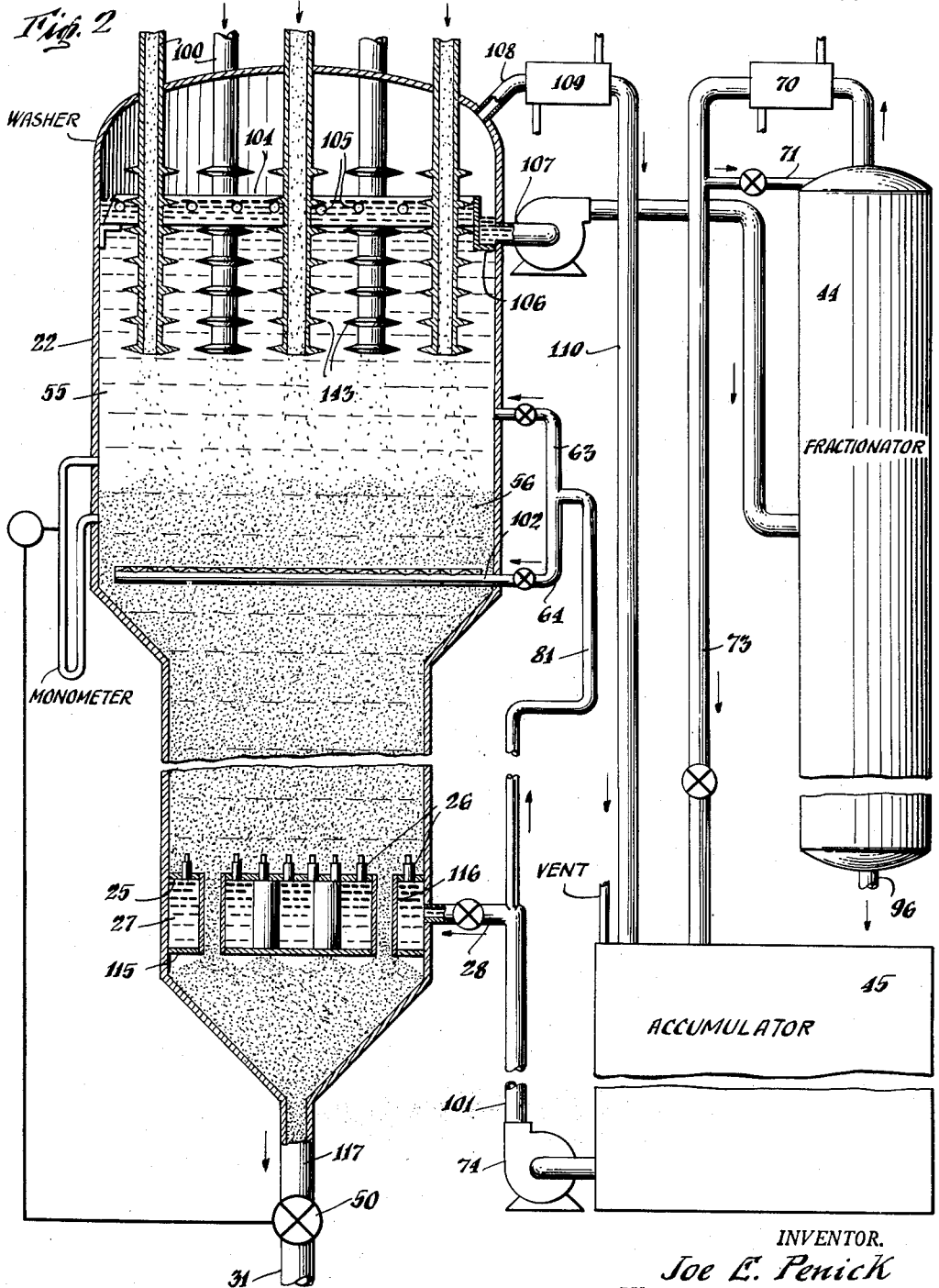
Figure 3:
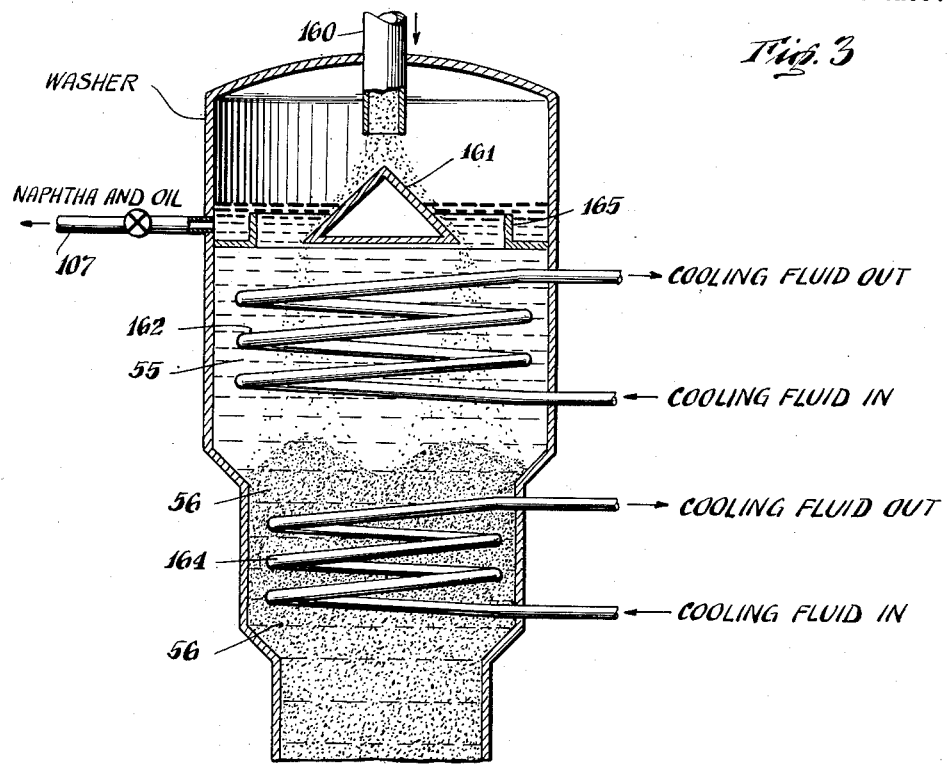
Figure 4:
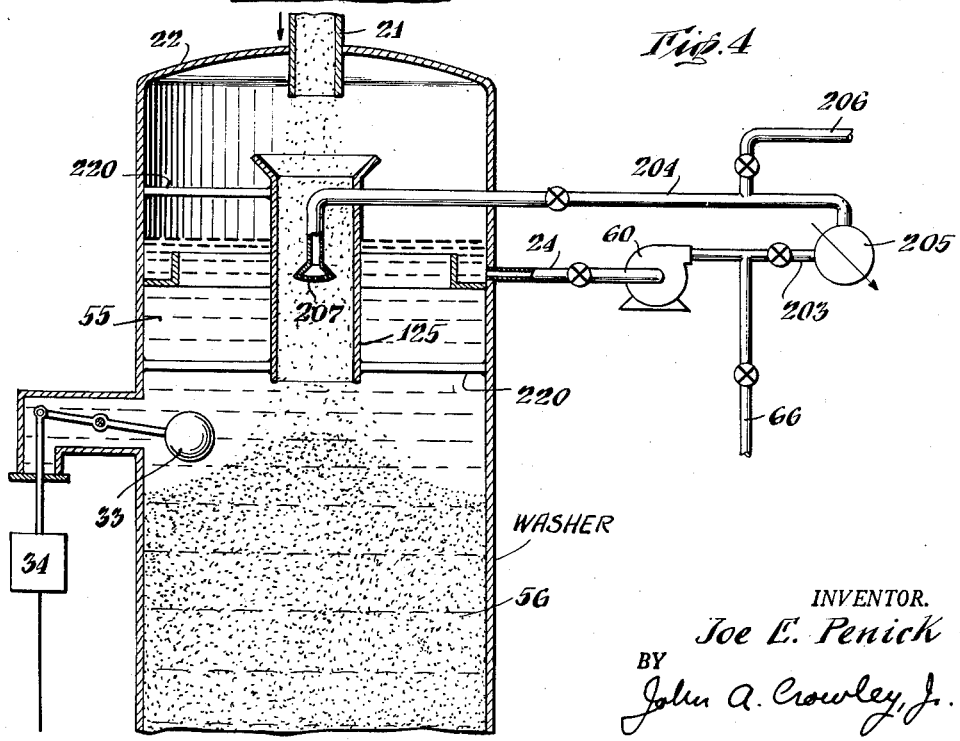
Figure 5:
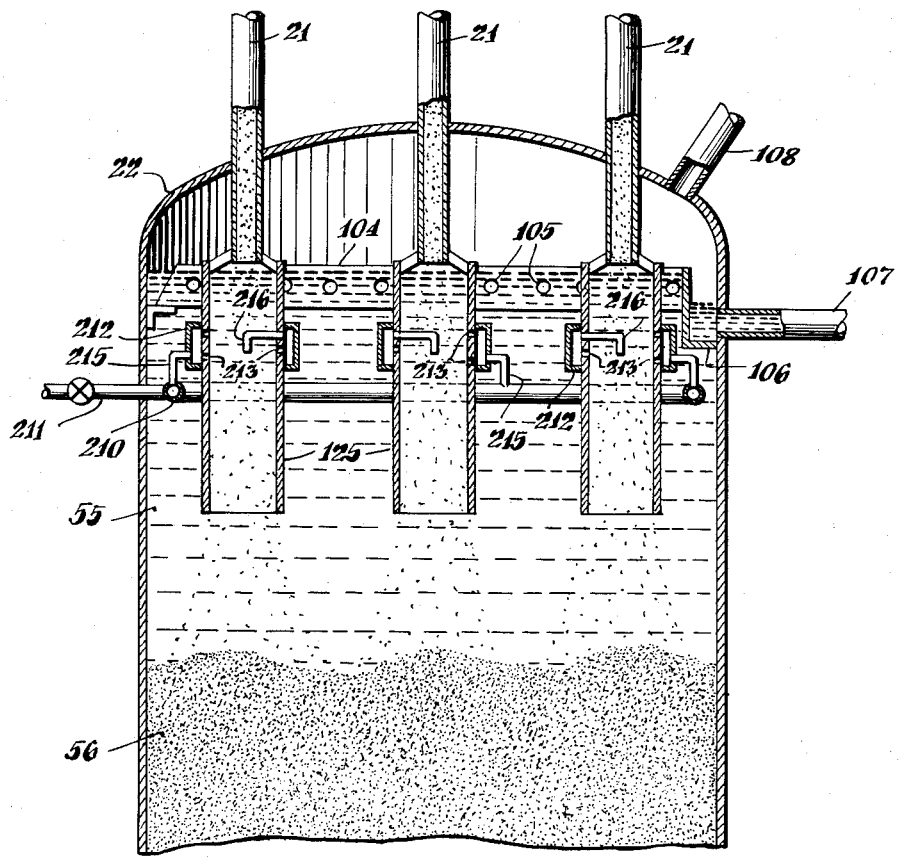

The invention may be most readily understood by reference to the drawings of which Figure 1 is an elevational view, partially in section, of a cyclic treating system which may be operated in accordance with this invention. Figure 2, is an elevational view, partially in section of a washer and the cooling and fractionation systems to be employed therewith in accordance with a modified form of this invention. Figure 3 is an elevational view, partially in section, showing the upper section of another form of washing zone adapted for operation by the method of this invention. Figures 4 and 5 are similar views showing forms of the invention with which this application is particularly concerned. All of these drawings are highly diagrammatic in form.

Turning now to Figure 1, there is shown a supply hopper 10 arranged above and communicating with a treater 11 via an adsorbent supply conduit 12. A measuring or forced feed valve 13 is provided in conduit 12 to control the rate of adsorbent flow to the treater. Any of a number of alternative feed devices may be employed at this point, a preferred alternative being shown in application Serial Number 237,264, filed in the United States Patent Office July 17, 1951. The treater is provided with an outlet 14 for treated oil product and an inlet 15 for oil feed. Suitable means for effecting a pre-soaking and de-aeration of the adsorbent feed may be provided in the upper section of the treater such as the arrangement shown in application Serial Number 237,268, filed in the United States Patent Office on July 17, 1951. Suitable means for distributing the liquid oil feed may be provided within the lower section of the treater such as is shown in application Serial Number 237,266, filed in the United States Patent Office on July 17, 1951. A plurality of outlet conduits 18 are provided for withdrawal of spent adsorbent from the bottom of the treater and these conduits connect into a stream combining cone 19. A single drain 21 conduit containing a flow measuring or regulating valve 20 connects the cone 19 with a vertical washer 22. Details of the adsorbent drain and flow control system are described and claimed in application Serial Number 237,267, filed in the United States Patent Office on July 17, 1951. A manometric level indicating and control device 23 with suitable instrumentation 24 and motor controller 25 are provided to control the adsorbent column level in the treater within a fixed narrow range. Such a level control arrangement is the subject of claims in application Serial Number 237,190, filed in the United States Patent Office on July 17, 1951, now abandoned in favor of continuation-in-part application, Serial Number 387,744, filed in the United States Patent Office October 22, 1953. The conduit 21 terminates within the upper section of washer 22 at a level spaced below the solvent outlet conduit 24. It will be understood that the adsorbent may be introduced into the washing zone through a plurality of conduits similar to conduit 21, particularly when the washer is of substantial lateral dimension. A partition 25 containing uniformly distributed flow nozzles 26 is provided across the lower section of the washer so as to define a liquid inlet plenum chamber 27. A liquid inlet conduit 28 connects into the washer at the level of chamber 27. The nozzles 26 may be of any of a number of designs adapted for accomplishing uniform distribution of the solvent across the columnar mass in the washer. One desirable form of nozzle is the subject of claims in application Serial Number 237,265, filed in the United States Patent Office on July 17, 1951. Adsorbent drain conduits 29 connect through and depend from the partition 25 and terminate below the washer in a flow combining cone 30. A single drain conduit 31 connects from the cone 30 to a drier 32. A level measuring float 33 is provided in the washer to activate instrument 34 which in turn actuates controller 85 operating the motor controlled flow regulating valve 50 in conduit 31. A level regulating and flow control arrangement of this type is the subject of claims in application Serial Number 237,189 filed in the United States Patent Office on July 17, 1951, now abandoned in favor of continuation-in-part application, Serial Number 387,743, filed in the United States Patent Office October 22, 1953. The drier 32 may partake of any of a number of suitable designs, the one shown diagrammatically in Figure 1, having an inlet near its lower end for stripping gas and an outlet near its upper end for recovered solvent and the stripping gas. A preferred form of drier for this purpose and its operation are the subject of claims in applications Serial Numbers 277,983, now abandoned, and 278,060, now United States Patent 2,724,190, issued November 22, 1955, both filed in the United States Patent Office on March 22, 1952. A regenerator 37 is provided below the drier and connects thereto through adsorbent flow pipe 38. The regenerator may take any of a number of forms well known to the art adapted for removal of carbonaceous contaminants from adsorbents by combustion at controlled elevated temperature levels. The regenerator shown is provided with an air inlet 39 at an intermediate level and flue gas outlets 40 and 41 near the upper and lower ends of the vessel respectively. Cooling coils 42 are provided below the regeneration zone. In connection with the washer there are provided a fractionator 44 and an accumulator 45, the operation and purpose of which are discussed hereinbelow.

For the purpose of illustration, the application of the invention to the decolorization of a lubricating oil will be described. As stated hereinbefore, the invention is concerned only with operations wherein the treating is conducted at elevated temperatures and with a method for washing adsorbents existing prior to the washing step at elevated temperatures, which if permitted to persist in the washer, would result in substantial or excessive resolution of the color bodies or boiling of the solvent or both. Such elevated temperatures are very often required in the treating zone in order to control the oil viscosity within a range which will permit practical oil flow rates through the treater without disruption of the adsorbent column therein. The elevated treating temperature may be maintained by supply of the adsorbent to the treater at a suitable elevated temperature via conduit 12 or by preheating the oil feed in a heater 50 or partially by both methods. The oil feed passes upwardly through the columnar mass in the treating zone at a temperature of the order of 350° F., for example, whereby impurities and color bodies are removed therefrom, the purified oil product being withdrawn via conduit 14. The spent adsorbent bearing carbonaceous contaminants including color bodies and entrained oil or cycle oil passes from the bottom of treater 11 via conduits 18 to the cone 19 and then to the washer via conduit 21 at a rate controlled by valve 20. If desired, a drainer may be provided to drain a portion of the oil from the spent adsorbent prior to its introduction into the washer. The oil removed from the treating zone with the spent adsorbent is substantial, in amount, and may range from 0.02 to about 2.0 volumes of oil per volume of fresh oil feed. It may in some cases be darker in color than the fresh feed although often it is equal to or superior to the fresh oil in physical properties such as color, and carbon residue. Usually because of the substantial amount of the cycle oil it is important that it be recycled to the treating zone. The adsorbent and oil so supplied to the washer initially exist at or near the treating temperature, for example, 340° F. Since the flow is controlled by valve 20 the adsorbent drops freely through conduit 21 into the body of liquid 55 which is maintained in the upper section of the washing zone above the columnar mass of adsorbent 56. The adsorbent discharging from the end of conduit 21 at a level substantially above the surface of the columnar mass, drops through a substantial portion of the liquid body prior to reaching the columnar mass surface and is, therefore, cooled by direct heat exchange with the solvent-oil liquid to a temperature sufficiently low to prevent removal of excessive amounts of the color bodies from the adsorbent when contacted extensively with the solvent. By excessive amounts of color bodies is meant such an amount as would so contaminate the cycle oil that the product yields from the treater per unit weight of adsorbent throughput would fall to an impractically low level, for example less than about seventy percent of that obtainable on the basis of 100 percent fresh oil charge. In general, the amount of color bodies removed from the spent adsorbent by the solvent should not exceed about 50 percent and should preferably be below about 25 percent by weight of the total color bodies on the spent adsorbent leaving the treater. In many operations it is preferred to exclude resolution of any substantial amount of color bodies in the washing step, i. e. an amount of color bodies which render the recovered cycle oil substantially darker than the fresh oil originally supplied to the treater. While not in all cases necessary, if desired, inert gas may be injected into the pipe 21 via a suitable inlet pipe (not shown) to prevent the rise of liquid or vaporous solvent thereinto. A suitable washing solvent is introduced into the washing zone via conduit 28 and distributed through nozzles 26 into the lower section of the columnar mass of adsorbent. The solvent passes upwardly through the columnar mass to effect removal of the cycle oil from the adsorbent while leaving carbonaceous contaminant including the color bodies on the adsorbent. The solvent may consist of a naphtha fraction boiling within the range 210–300° F. The solvent and removed oil pass upwardly from the columnar mass 56 into and through the liquid body 55 and are removed entirely in the liquid phase from the upper section of the liquid body via conduit 24. A portion of the solvent and oil are circulated by pump 60 through cooler 61 and back into the lower section of the liquid body 55 via conduits 62 and 63. By this means the liquid body is maintained at a temperature below the boiling point of the solvent. Preferably the amount of cooling in this manner should be sufficient to maintain the temperature of the liquid body 55 at least in the portion thereof near the surface of the columnar mass 56 below a level at which excessive amounts of color bodies would be removed from the adsorbent when contacted extensively with the solvent. Usually the adsorbent is cooled by heat exchange with the liquid body sufficiently so that it reaches the washing column surface at least below the boiling point of the solvent and preferably below the temperature at which substantial amounts of the color bodies would be removed by the solvent in the washing column. However, if the amount of cooling of the entering adsorbent by the liquid body is not sufficient to cool it to the desired temperature by the time it reaches the columnar mass, the adsorbent may be further cooled by injection of a portion of the cooled liquid into the upper section of the columnar mass via conduit 64.

Also in a modified form of the invention the hot adsorbent from the treater may be substantially cooled by the liquid body in the washer, for example from a treating temperature of 350° F. to 200° F., and the average washing temperature is maintained at a still lower temperature, for example 140° F., at which excessive amounts of color bodies are not removed from the adsorbent by control of the rate and temperature of washing solvent supply to the lower section of the columnar mass in the washing zone. In this operation sufficient additional heat is extracted from the liquid body above the columnar mass, by means described above to prevent substantial vaporization of the wash solvent, which may boil in the range 210–300° F., for example. In this latter form of the invention it is important that the heat capacity of the solvent supplied to the washing zone between its inlet temperature and the temperature of the partially cooled adsorbent falling onto the top of the columnar mass in the washing zone be at least equal to the heat capacity of the adsorbent over the same temperature range; and preferably the heat capacity of the solvent should be at least 10 percent in excess of the amount above indicated. Under these conditions the adsorbent is withdrawn from the washing zone substantially at the solvent inlet temperature and the solvent leaves the top of the columnar mass at or somewhat below the temperature of the partially cooled adsorbent falling from the liquid body onto the columnar mass. The advantage in the last mentioned method lies in the fact that the washing operation may be conducted at suitably low washing temperatures while the liquid body is maintained at a somewhat higher temperature where the viscosity of the mixed solvent-oil liquid is lower than it would be if the liquid body were cooled all the way down to the desired washing temperature. As a result the fluid viscosity in the zone where the liquid is disengaged from the spent adsorbent feed is maintained at a level better suited for effecting the disengagement without adsorbent entrainment in the effluent.

Considering again the cycle oil removed from the top of the washer the remaining portion of the solvent-oil liquid stream removed from the liquid body passes via pipe 66 to fractionator 44 wherein the solvent is separated from the oil, any small amounts of color bodies which may have been removed usually going into the oil. The recovered cycle oil is recycled from the bottom of the fractionator to the treater inlet 15 via pump 68 and pipe 69. If desired some or all of the recovered oil may be withdrawn to storage via pipe 75, but it is usually preferable to recycle all or at least most of the oil to the treater so that there is ultimately withdrawn from the system only a single oil product. The recovered solvent passes from the top of the fractionator to the condenser 70. A portion of the condensate passes to the fractionator 44 as reflux via pipe 71 and the remainder passes to the accumulator 72 via pipe 73. The solvent passes via pump 74 and pipes 76 and 80 to the washer solvent inlet pipe 28 as the solvent charge. Any make-up solvent which may be required is supplied via pipe 78.

If desired, a portion of the solvent may be pumped via pipe 81 to pipes 63 and 64 as the cooling liquid, in which event all of the solvent-oil stream withdrawn from the liquid body is pumped directly to the fractionator.

Washed adsorbent bearing color bodies and other carbonaceous contaminants and some entrained solvent but being substantially free of cycle oil is withdrawn from the lower section of columnar mass 56 via conduits 29 to the combining cone 30 thereby promoting downward flow of the adsorbent through the columnar mass. The rate of adsorbent withdrawal is regulated by means of the float type level measuring device 33 and control instruments 34 and 85 and the motorized valve 50 in drain pipe 31 so as to maintain the surface level of the columnar mass substantially constant. The washed adsorbent passes via pipe 31 to a drier 32 wherein the entrained solvent is removed by heating to a temperature of the order of 300–500° F. in the presence of a stripping gas such as steam or flue gas, entering via pipe 95. The solvent and stripping gas are passed from the drier via pipe 87 to a suitable separator, the separated solvent being recycled to the washer or to the accumulator 72. Usually, the drier temperatures are maintained sufficiently low that the color bodies remain on the adsorbent in the drier, but when they are removed in substantial amounts, they are separated from the solvent before recycling of the solvent to the washing step. The dried adsorbent passes to the regenerator 37 via pipe 38 and is then subjected to a combustion supporting gas such as air at temperatures of the order of 900–1400° F. to effect removal of the contaminant deposit and color bodies by burning. After regeneration the adsorbent is cooled by means of coil 42 to a temperature level suitable for reuse in the treater and the cooled adsorbent is returned to the treater supply hopper 10 via conveyor 92 and chute 93.

If desired, the spent adsorbent entering the washing zone may be cooled by means of indirect heat transfer rather than by the method of direct heat transfer with the solvent as shown in Figure 1. Such an arrangement is shown in Figure 2, in which there is shown a modified form of washer, and in which the same numerals are applied to elements corresponding to those in Figure 1. In the arrangement shown in Figure 2 the spent adsorbent enters the washing zone as a plurality of laterally spaced vertical streams, confined in the tubular inlet pipes 100. The pipes 100 extend a substantial distance below the surface of the liquid body 55 so that the adsorbent is cooled by indirect heat transfer with the solvent to a temperature preferably below the boiling point of the solvent prior to its discharge from the tubes at a common level above the surface of column 56. Fins 143 may be provided on the tubes 100 to augment the heat transfer surface. If desired, inert gas may be supplied into the pipes 100 above the washer to prevent entry of liquid into the lower ends of the pipes. The liquid body is cooled by recirculation of cooled solvent from accumulator 45 via pump 74 and pipes 101, 81 and 63. The adsorbent may be further cooled by introduction of a portion of the cooled solvent via pipe 64 into the perforated pipe distributor 102. It will be understood that a plurality of the distributors 102 may be distributed across the horizontal cross-sectional area of the adsorbent column.

A channel 104, is positioned across the upper section of the washer for liquid solvent-oil removal. A plurality of liquid flow orifices 105 are provided at spaced intervals along a common level on the channel intermediate its open top and closed bottom. One end of the channel connects into a drain trap 106 into the lower portion of which the outlet pipe 107 is connected. This arrangement for liquid withdrawal is the subject of claims in application Serial Number 265,832, filed in the United States Patent Office on January 10, 1952. While it is desirable in order to prevent excessive resolution of the color bodies and entrainment of adsorbent in the effluent solvent to maintain the temperature throughout the liquid body below its boiling point, it has been found to be possible by the arrangement shown in Figure 2 to cool the adsorbent to a suitable temperature before its discharge into the liquid body well below its surface while a minor portion of the solvent is vaporized at the surface of the liquid body where the vapors do not interfere with the adsorbent fall onto the columnar mass. In this manner, portion of the cooling load is met by the vaporization of some of the solvent, the vapors being withdrawn via pipe 108 to condenser 109 from which the condensate passes via pipe 110 to the accumulator 45. This method of operation, involving the removal of the solvent partially as a vapor and partially as a liquid while relying on the vaporization of some of the solvent for a portion of the heat removal load from the washer, is the subject matter of specific claims in my application Serial Number 321,371, filed in the United States Patent Office on November 19, 1952. The present application is more particularly and specifically concerned with the method of operation wherein the solvent-oil stream is withdrawn entirely in the liquid phase, the cooling being accomplished entirely by circulation of a cooling fluid, but in its broadest aspects this application is intended to be broad to both methods of operation.

In order to prevent excessive liquid velocities in the upper section of the washer due to the generally higher temperatures existing there and due to the addition of recovered oil and recycle solvent to the principal stream of wash solvent, the upper portion of the washer particularly that portion occupied by the liquid body 55 and preferably that portion above the distributors 102 is expanded in horizontal cross-sectional area. In this manner, the liquid velocity is controlled below those which would entrain the adsorbent in the effluent liquid stream. It will be understood that the washer shown in Figure 1 may be similarly expanded in cross-section near its upper end.

The washer shown in Figure 2 further differs from that shown in Figure 1 in the adsorbent withdrawal system. In Figure 2, a second partition 115 is positioned across the washer below the distributor partition 25 and above the bottom of the washer, thereby providing an enclosed liquid feed plenum space 27. Washed adsorbent is withdrawn from above the partition 25 to a level below the partition 115 by a ring of uniformly spaced tubes 116. The adsorbent is then combined into a single bed from which it is withdrawn via the single central outlet conduit 117.

If desired, the heat may be extracted from the upper section of the washing zone by means of indirect rather than direct heat transfer between the liquid body and a suitable cooling fluid. Such an arrangement is shown in Figure 3 in which there is shown the upper portion of a modified washing zone. In this arrangement, spent adsorbent and cycle oil enter the washer at a controlled rate through conduit 160 which delivers the adsorbent onto a distributing cone 161 above the surface of the liquid body. The solid material falls from the edge of the cone 161 down through the liquid body so as to be cooled thereby to the desired temperature. In turn, heat is extracted from the liquid body by indirect heat transfer with a suitable cooling fluid such as water, naphtha, air, etc., circulated through the cooling coil 162. The adsorbent may be further cooled by passage of a similar cooling fluid in indirect heat transfer relationship with the upper portion of the columnar mass 56 via cooling coil 164. The upper portion of the washing vessel is expanded in cross-section along an upper section of the columnar mass and still further expanded along the liquid body so as to insure substantially complete disengagement of the adsorbent particles and the solvent-oil mixture. The liquid solvent and oil are withdrawn from the surface of the liquid body by overflow into the annular collecting channel 165 from which it is withdrawn via conduit 107. It will be understood that in place of the method for adsorbent delivery into the liquid body shown in Figure 3 other methods such as those shown in Figures 1 and 2 or those shown hereinafter in Figures 4 and 5 may be employed in conjunction with heat removal from the liquid body and columnar mass by cooling coils as shown in Figure 3.

It will be noted that the forms of the invention so far discussed all involve passage of the hot spent adsorbent in either direct or indirect heat transfer relationship with the liquid body maintained above the columnar mass in the washer and the extraction of heat from the liquid body to maintain the temperature at least in the portion thereof near the surface of the columnar mass below that at which substantial amounts of color bodies or the undesired components would be removed from the spent adsorbent by the solvent. Those specific forms of operation were originally the subject matter of claims in my copending application Serial Number 321,372, filed in the United States Patent Office on November 19, 1952. The present application is now intended to cover those methods of operation and further is concerned with the somewhat different method of operation discussed hereinafter.

Referring again to Figure 1, instead of effecting the cooling of the hot spent adsorbent by heat exchange with the liquid body 55, a portion of at least the solvent component of the mixed oil and solvent liquid withdrawn from the upper section of the liquid body via pipe 24 may be introduced into the adsorbent feed conduit 21 to contact the hot adsorbent therein and to cool it to a temperature below that at which the color bodies would be removed from the adsorbent in substantial or excessive amounts by the solvent in the washer or to a temperature below the boiling point of the solvent or preferably both. The cooled adsorbent then drops through the liquid body onto the surface of the columnar mass 56. As stated, the cooling fluid injected into the conduit 21 is comprised of a portion at least of the solvent component of the mixed liquid withdrawn from the upper section of the washing zone. By this it is intended that either a portion of the mixed oil and solvent may be pumped by pump 60 through pipe 200 into the conduit 21 or alternatively a portion of the solvent recovered in the accumulator 45 may be pumped via pipes 76, 81, 63 and 201 into the conduit 21. If desired, the mixed oil-solvent liquid when passed through pipe 200 may be cooled by cooler 202, although this is not in all cases necessary.

It is contemplated that in its broader aspects the invention also covers the less preferred alternative of discharging the cooled adsorbent directly from the lower end of pipe 21 onto the columnar mass in the washer instead of terminating this pipe 21 in the liquid body somewhat above the columnar mass as discussed hereinabove. In this case the valve 20 may be omitted and the rate of flow through both the treater and the washer would be controlled by the valve 50 below the washer.

Turning now to Figure 4, there is shown the upper section of a washer 22 with the liquid body 55 being maintained above the columnar mass 56. Hot spent adsorbent drops from the feed conduit 21 into the open upper end of the vertical tube 125 at a rate, controlled by suitable throttling means associated with conduit 21, below the free settling rate of the liquid within the tube 125. It will be noted that the tube 125 terminates on its open lower end at a level below the surface of the liquid body 55 but above the surface of the columnar mass 56. The liquid solvent-oil mixture seeks its level within the tube 125 and the adsorbent drops freely therethrough. The tube 125 is supported centrally within the upper section of the washer by members 220 and is of greater lateral dimension than the pipe 21 but has a horizontal cross-sectional area amounting to only a minor fraction of that of the washer 22, whereby adequate settling area is provided in the surrounding liquid body 55. The liquid oil mixture withdrawn from the body 55 via pipe 24 may be pumped via pipe 203, cooler 205 and pipe 204 to the distributing nozzle 207 by which it is sprayed downwardly into the upper portion of the tube 125. If desired, recovered cooled naphtha from the fractionator may be supplied via pipe 206. By this method, not only is the desired cooling effected before the adsorbent drops from the lower end of the tube 125 through the intervening portion of the liquid body and onto the surface of column 56, but also the downward jet of cooling liquid helps to prevent flow stoppages due to bridging or sticking of wet adsorbent in the tube 125. Also, any gas removed from the entering adsorbent and any vapors formed due to initial contact of hot adsorbent with the solvent are removed from the upper ends of tubes 125 above the surface of the liquid body thereby avoiding interference with the free settling of the solid particles in the surrounding liquid body and avoiding the creation of eddy currents in the liquid body which would cause entrainment of the adsorbent particles in the effluent solvent-oil liquid.

When the washing tower is of substantial diameter, it is usually preferable to introduce and cool the adsorbent through a plurality of tubes 125 uniformly spaced and distributed over the horizontal cross-sectional area of the liquid body within the upper section of the washing zone. Such an arrangement is shown in Figure 5, wherein elements corresponding to those in the other drawings are designated by the same numerals. In the apparatus shown in Figure 5 the arrangement for distributing the liquid within the tubes 125 differs somewhat from that shown in Figure 4. A ring manifold 210 supplied by a conduit 211 is supported within the washer by suitable means not shown. Annular manifold boxes 212 are connected around the upper section of each tube 125 and are communicated with the interior of the tubes 125 through a plurality of orifices 213 in the side wall thereof. Pipes 215 connect the manifold boxes with the ring header 210. Also, at least one tube 216 having a downwardly facing discharge end communicates with each manifold box through the wall of tube 125. By this arrangement cooling fluid is injected not only downwardly into a central portion of the cross-section of each tube 125 but also horizontally at a number of points around the periphery thereof. Also it is contemplated that in operations wherein the spent adsorbent is cooled by solvent injection thereinto as it flows toward the washing column as discussed hereinabove in connection with Figures 1, 4 and 5, the adsorbent may be cooled by solvent injection only to a level which is below the boiling range of the solvent but still above temperatures which would preclude removal of excessive or substantial amounts of color bodies from the adsorbent in the washing zone. The adsorbent is then further cooled to a suitable washing temperature level by control of the rate and temperature of washing solvent introduction into the lower sections of the columnar mass in the washing zone.

While it is usually unnecessary, it is contemplated that in some operations it may be desirable in connection with the method disclosed in Figures 4 and 5 to extract some heat from the liquid body 55 by any of the methods discussed in connection with Figures 1–3.

As indicated hereinabove, it is important to maintain the adsorbent as a columnar mass of downwardly flowing particles in the contacting portions of the treating and washing zones. To this end, the rate of liquid flow upwardly through the columnar mass in the treating and washing zones are carefully controlled below levels which would interfere with the downward direction of flow of the adsorbent particles or cause disruption of the columnar mass. While some expansion of the columnar mass may be tolerated, liquid velocities should be avoided which are so high as to cause the adsorbent particles to move upwardly through the treating or washing zones since such high velocities would prevent true countercurrent contacting of the liquid and adsorbent with resultant decrease in efficiency in the treating or washing steps. The superficial velocity of the liquid oil through the treater and of the solvent through the washer generally fall in the ranges about ½ to 20 and 1 to 30 feet per hour respectively and preferably 1–10 and 5–20 feet per hour respectively. (Based on liquid at the contacting temperature and the free cross-sectional area of the treater or washer when empty.) In the oil treating zone the temperature should be maintained sufficiently high to control the oil viscosity in the treater below the maximum expressed by the formula:

$$Z = \frac{250{,}000 D^2}{U}\left(\frac{S_a}{1-F}\right)\left(1-\frac{S_L}{S_T}\right)$$

where $Z$ is the maximum allowable viscosity in centipoises, $D$ is the average particle diameter in inches (calculated by averaging the reciprocal of the particle diameters), $U$ is the superficial oil velocity through the contacting zone in feet per hour (calculated on the basis of the total zone cross section when empty of adsorbent), $S_a$ is the adsorbent apparent density in grams per cubic centimeter (conveniently determined by pouring a sample of adsorbent into a graduated container without agitation of the container and then weighing a measured amount), $F$ is the fraction of voids between the adsorbent particles under the same conditions at which the apparent density is determined, $S_T$ is the true density of the adsorbent particles in grams per cubic centimeter and $S_L$ is the density of the oil under the conditions existing in the contacting zone in grams per cubic centimeter.

In the washing step any suitable non-polar solvent may be employed which boils substantially below the oil treated and at a sufficiently low temperature to permit recovery of the oil therefrom in undamaged form. Typical of solvents which may be employed are carbon tetrachloride, normal heptane, normal octane, petroleum naphtha boiling within the range 100 to 400° F. and carbon disulfide. A preferred solvent is a paraffinic naphtha boiling within the range of about 210–300° F. The temperature in the columnar mass during the washing operation should be controlled below that at which substantial vaporization of the solvent occurs. In the case of operations in which color bodies constitute one of the impurities removed from the hydrocarbon feed to the treating zone, the temperature in the washing column should also be maintained preferably below that at which the color bodies would be removed from the adsorbent in substantial amount, i. e. in an amount sufficient to render the color of the recovered cycle oil substantially darker than that of the fresh oil feed to the treater. Substantially darker cycle oil colors than the fresh oil feed will result in decreased yields of oil product of specified color per unit of adsorbent throughput. Thus it is preferred in many operations to limit the amount of color bodies removed from the adsorbent in the washer below about 25 percent by weight of the color bodies on the adsorbent entering the washing zone. For many operations it has been found feasible to accept a reduction in product yield of down to about 70 percent of that obtainable on 100 percent fresh oil feed so as to tolerate a cycle oil of somewhat darker color than the fresh oil feed. In no case, however, should the temperature in the washing zone be permitted to rise to a level at which excessive amounts of color bodies would be removed from the adsorbent, i. e. amounts sufficient to result in an unfeasibly low product yield from the treater. In general the amount of color bodies removed by the solvent in the washing operation should be maintained below about 50 percent by weight of the color bodies on the adsorbent. The solvent should enter the lower section of the washer below the above mentioned temperature limits. The temperature at which either substantial or excessive amounts of color bodies will be dissolved from the adsorbent will, of course, depend somewhat upon the nature of the solvent, the nature of the adsorbent and the nature of the color bodies and the amount and color of the cycle oil relative to that of the oil feed involved and the amount of cycle oil removed from the adsorbent. This temperature can be determined by routine tests for any given application. As an example in the case of a 30 to 60 mesh granular fuller's earth adsorbent which has become spent in decolorizing a bright stock oil from an original color of 180 Lovibond to a finished color of 90 Lovibond, the cycle oil amounted to about 0.12 part per part of oil product and to about 1.8 parts by weight per part of adsorbent. Using a paraffinic naphtha wash solvent boiling in the range about 210 to 330° F., sufficient color bodies were removed from the adsorbent to render the cycle oil color substantially darker than that of the original oil feed to the treater at temperatures above about 200° F. On the other hand, when the adsorbent was cooled to about 120° F. prior to its passage through the column thereof in the washing zone, the color of the recovered cycle oil was only 175 Lovibond.

As another example in the case of a 20–48 mesh (Tyler Screen Analysis) granular bauxite adsorbent which had become spent in decolorizing a solvent refined distillate oil from an original color of 14 Lovibond to a finished color of 2 Lovibond, the recovered cycle oil amounted to about 0.13 part per part of oil product from the treating zone and to about 0.9 part by weight per part of adsorbent throughput. Using a paraffinic wash naphtha boiling in the range 255–375° F. sufficient color bodies were removed to render the cycle oil substantially darker than that of the original feed to the treater at a temperature above 175° F. On the other hand when the adsorbent was cooled to about 105° F. prior to its passage through the column thereof in the washing zone, the color of the recovered oil was only about 10 Lovibond.

The volumetric ratio of solvent to adsorbent charged to the columnar mass in the washer may vary within the range about 0.25 to 3.0 and preferably 0.4 to 1.5. The length of the columnar mass of adsorbent may range from about 5 to about 20 feet. The length of the liquid body above the columnar mass may range from about 1 to 10 feet in height. When the adsorbent is cooled by indirect heat transfer as in Figure 2, the distance which pipes 100 extend below the surface of the liquid body 55 depend mainly on the relative temperatures of the entering adsorbent and of the liquid body, the overall heat transfer coefficient and the properties of the solvent. Generally, the pipes 100 should extend from about 2 to 6 feet below the surface of the liquid body. They may terminate directly on or from 6 to 18 inches above the surface of the columnar mass.

When the adsorbent is cooled by direct contact with the liquid body in the manner shown in Figures 1 and 3, the discharge ends of the adsorbent feed pipes 21 and 160 respectively and the level of liquid withdrawal from the body 55 should be so disposed with respect to the surface of column 56 to provide a vertical distance for adsorbent fall through the liquid body broadly within the range 1 foot to 10 feet and preferably within the range 2 feet to 6 feet. This fall distance may be omitted in the case of Figure 1, when the adsorbent cooling is effected by injection of cooling fluid into the pipe 21.

When the adsorbent is cooled by injection of cooling liquid into the open tubes 125 shown in Figures 4 and 5, sufficient tube length should be provided to permit the desired heat exchange to be accomplished by the time the absorbent discharges from the lower ends of the tubes. The tubes 125 should range in vertical length broadly from about 6 inches to 6 feet and preferably from about 2 feet to 4 feet. Tubes 125 should extend below the surface of the liquid body at least 1 foot and preferably 3 feet and should terminate above the surface of the columnar mass a distance of at least three inches and preferably more than six inches. In the arrangements of Figures 4–5, the adsorbent should preferably be supplied to the tubes 125 at a rate not in excess of the maximum rate at which the adsorbent particles will freely fall through the column of solvent within the tubes. In the arrangements of Figures 1–3, the flow of adsorbent should be throttled above the washer so that it falls freely through the feed pipes into the liquid body in the washer.

By way of example, the application of this invention to a typical petroleum oil decolorization operation may be considered. A petroleum bright stock having an original color of 200 Lovibond and gravity of 27.6° API is decolorized at a temperature of about 300° F. by passing upwardly through a columnar mass of granular fuller's earth of about 15 to 30 mesh size (Tyler). The oil product has a color of about 100 Lovibond and the yield including product from recycle will be about 14 pounds decolorized oil product per pound adsorbent throughput (dry basis). The spent adsorbent enters the washer at an initial temperature of about 300° F. and carries with it about 1.8 pounds oil per pound of adsorbent (dry basis) or about 0.11 volume oil per volume of fresh oil charge. In the washing zone the adsorbent is cooled by the liquid body so that the temperature near the upper end of the columnar mass in the washing zone is below about 120° F. A 210 to 330° F. paraffinic naphtha cut is passed upwardly through the columnar mass in the washing zone at a temperature of about 90° F. The solvent feed rate is about 2.3 pounds per pound of adsorbent (dry basis) and the adsorbent column is about 10 feet in height. The solvent-oil stream is withdrawn from the top of the liquid body entirely as a liquid and a portion thereof is cooled to about 120° F. and injected into the confined stream of hot spent adsorbent entering the washing zone. The rate of cooling fluid injection is about 5 pounds of fluid per pound of adsorbent charge to the washer. The remainder of the solvent oil stream is subjected to fractionation to recover the cycle oil. The recovered oil has a color of about 200 Lovibond and is recycled to the treater as feed in addition to the fresh oil feed. Washed adsorbent substantially free of oil is then subjected to drying at about 400° F. and regeneration by burning at 1000 to 1400° F. and is finally cooled to about 300° F. and recycled to the treater. When the above operation is modified to the extent of delivering the hot spent adsorbent onto the surface of the columnar mass in the washer at about 200° F., the color of the recovered oil is about 250 Lovibond. If this oil should be recycled to the treater, the color of the oil product will drop off to about 125 Lovibond. In order to obtain the desired finished oil color of 100 Lovibond, it would be necessary to decrease the oil to clay throughput ratio to 10 pounds of oil product per pound of clay. This latter operation is exemplary of the broader and less preferred limit of the coverage of this invention. In the case of the solvent employed any substantially higher washer temperature would have resulted in undesirable vaporization of the solvent. If a higher boiling point solvent is employed and the cooling of the spent adsorbent stream is substantially less than will reduce its temperature to 200° F., the amount of color bodies removed will be such as to result in unfeasibly low product yields from the treater.

A suitable washer for the above application is one having the general form of the vessel shown in Figure 2 except that the adsorbent is supplied in a single pipe similar to conduit 21 of Figure 1, with cooling fluid injection directly into the conduit 21 below the flow throttling valve thereon but substantially above the lower end thereof. The lower portion of the washer has a diameter of about 2½ feet and length of about 11 feet above the solvent distributing plate. The expanded disengaging section has a diameter of about 6 feet and a height of about 8 feet overall. The feed conduit 21 discharges about 1 foot above the surface of the 10½ foot high columnar mass in the washer. The solvent-oil mixture is withdrawn from the disengaging section about 6½ feet above the surface of the columnar mass. The feed conduit 21 is an 8 inch diameter pipe and the cooling fluid is injected thereinto at a level about 7½ feet above its lower end. This washer has a washing capacity for the decolorizing application described in the example above of about 4000 pounds of adsorbent (dry basis) per hour.

It is intended to cover all changes and modifications of the examples of the operation and application of this invention herein chosen for purposes of disclosure which do not constitute departures from the spirit and scope of the invention.

I claim:

1. In a continuous cyclic process for decolorization of mineral oils wherein a fresh mineral oil feed is passed upwardly through a columnar mass of gravitating adsorbent of palpable particulate form in a confined treating zone at a rate and elevated temperature adjusted for effecting the decolorization of the oil without disruption of the columnar mass due to the oil flow therethrough and wherein the spent adsorbent bearing carbonaceous contaminant including color bodies and cycle oil is subjected to washing for removal of the cycle oil with a suitable washing solvent capable of also removing substantial amounts of the color bodies from the spent adsorbent when contacted therewith at the elevated treating temperature and wherein the washed adsorbent is dried, regenerated by burning, cooled and recycled to the treating zone for reuse, the improvement which comprises, withdrawing the spent adsorbent bearing carbonaceous contaminant including color bodies and a substantial amount of cycle oil from the lower section of said treating zone, still at an elevated temperature near said treating temperature, cooling the adsorbent to a temperatuer level below that at which said solvent will remove substantial amounts of the color bodies therefrom and then passing the adsorbent downwardly as a columnar mass countercurrently to a stream of said solvent in a confined washing zone so as to effect removal of the cycle oil from the adsorbent while leaving the color bodies and carbonaceous contaminant on the spent washed adsorbent, withdrawing the solvent and removed oil from the upper section of said washing zone and subjecting the same to fractionation to separate the solvent from the oil, leaving a recycle oil having a color not substantially darker that that of the fresh mineral oil feed to the treating zone and recycling said oil to said treating zone along with the fresh mineral oil feed, the aforesaid cooling of said adsorbent being effected at least in a part sufficient to reduce the adsorbent from a substantially higher treating temperature to a temperature below the boiling temperature of said washing solvent by passing a cooling fluid from a location of heat extraction other than said washing zone and comprised to at least a substantial extent of wash solvent of the same type as that supplied to said washing zone into direct contact with said hot, spent adsorbent in a region where the adsorbent is freely flowing downwardly to effect rapid cooling of the adsorbent before it reaches said columnar mass in said washing zone.

2. In a continuous cyclic process for treating hydrocarbons with a moving adsorbent of palpable particulate form, wherein a hydrocarbon charge is passed upwardly through a columnar mass of gravitating adsorbent in a confined treating zone at a rate and elevated temperature selected for effecting the desired treatment of the oil and the removal of undesired components therefrom without substantial disruption of the columnar mass and wherein the spent adsorbent bearing the removed components and cycle hydrocarbons corresponding approximately to the original charge is subjected to washing for removal of the cycle hydrocarbons with a suitable washing solvent capable of also removing excessive amounts of said removed components when contacted extensively with the adsorbent at the elevated treating temperature level, and wherein the washed adsorbent is dried, regenerated by burning off of carbonaceous contaminants, cooled and recycled to the treating zone for reuse, the improvement which comprises in combination therewith, withdrawing the spent adsorbent bearing a substantial amount of cycle hydrocarbons similar to the original charge as well as said undesired components from the lower section of said treating zone still at an elevated temperature near the treating temperature, cooling the adsorbent in a region where the adsorbent is freely flowing downwardly to a temperature substantially below said elevated treating temperature and then passing the adsorbent downwardly through a confined washing zone through a substantial portion of which it flows as a columnar mass of particles, passing a suitable washing solvent upwardly through said columnar mass at a temperature suitable for removing the cycle hydrocarbons from the adsorbent but below that at which it would remove excessive amounts of said undesired components from the adsorbent, withdrawing the washed adsorbent substantially free of the cycle hydrocarbons from the lower section of said washing zone, withdrawing a liquid stream comprising the solvent and removed hydrocarbons from the upper section of said washing zone and subjecting at least a substantial portion of the same to fractionation to separate from the solvent a hydrocarbon recycle stock in which the percentage of the undesired components is below that which would cause excessive reduction in the yield of treated oil when said stock is recycled as compared with the yield in said treating zone on the basis of original feed only, and recycling substantially all said stock to the treating zone, the cooling of the spent adsorbent as aforesaid being at least in substantial part effected by cooling at least a solvent portion of the stream of liquid hydrocarbons and solvent removed from the upper section of said washing zone and at a location apart from the columnar mass in said washing zone and passing it into direct contact with the hot, spent adsorbent in an amount sufficient to cool the adsorbent from a substantially higher level to a temperature below the boiling temperature of said solvent before the adsorbent reaches said columnar mass.

3. In a continuous cyclic process for treating hydrocarbons with a moving adsorbent of palpable particulate form, wherein a hydrocarbon charge is passed upwardly through a columnar mass of gravitating adsorbent in a confined treating zone at a rate and elevated temperature selected for effecting the desired treatment of the oil and the removal of undesired components therefrom without substantial disruption of the columnar mass and wherein the spent adsorbent bearing the removed components and entrained hydrocarbons corresponding approximately to the original charge is subjected to washing for removal of the entrained hydrocarbons with a suitable washing solvent capable of also removing excessive amounts of said removed components when contacted extensively with the adsorbent at the elevated treating temperature level, and wherein the washed adsorbent is dried, regenerated by burning off of carbonaceous contaminants, cooled and recycled to the treating zone for reuse, the improvement which comprises in combination therewith, withdrawing the spent adsorbent bearing a substantial amount of entrained hydrocarbons similar to the original charge as well as said undesired components from the lower section of said treating zone still at an elevated temperature near the treating temperature, passing a cooling fluid, comprised to at least a substantial extent of the wash solvent, into direct contact with the hot spent adsorbent to effect rapid cooling thereof to a temperature substantially below said elevated treating temperature and below the boiling range of said solvent, thereafter passing the cooled adsorbent downwardly through a confined washing zone through at least a substantial portion of which it flows as a columnar mass of particles, passing a suitable washing solvent upwardly through said columnar mass to effect removal of the entrained hydrocarbons from the adsorbent, supplying said wash solvent into the lower section of said columnar mass at a rate and temperature controlled to effect a further reduction in the adsorbent temperature so that the temperature along said columnar mass is maintained within a range at which less than 50 percent by weight of said undesired components are removed from the adsorbent by the washing solvent, withdrawing a liquid stream comprising the solvent and removed hydrocarbons from the upper section of said washing zone, subjecting at least a portion of said stream to fractionation to effect separation of the solvent from the recovered hydrocarbons to obtain a hydrocarbon recycle stock in which the percentage of the undesired components is below that which would cause excessive reduction of the yield of treated oil from said treating zone due to recycling of said stock, and recycling said recovered hydrocarbons to said treating zone.

4. In a continuous cyclic process for treating hydrocarbons with a moving adsorbent of palpable particulate form, wherein a hydrocarbon charge is passed upwardly through a columnar mass of gravitating adsorbent in a confined treating zone at a rate and elevated temperature selected for effecting the desired treatment of the oil and the removal of undesired components therefrom without substantial disruption of the columnar mass and wherein the spent adsorbent bearing the removed components and cycle hydrocarbons corresponding approximately to the original charge is subjected to washing for removal of the cycle hydrocarbons with a suitable washing solvent capable of also removing excessive amounts of said removed components when contacted extensively with the adsorbent at the elevated treating temperature level, and wherein the washed adsorbent is dried, regenerated by burning off of carbonaceous contaminants, cooled and recycled to the treating zone for reuse, the improvement which comprises in combination therewith, withdrawing the spent adsorbent bearing a substantial amount of cycle hydrocarbons similar to the original charge as well as said undesired components from the lower section of said treating zone still at an elevated temperature near the treating temperature, passing a cooling fluid, comprised to at least a substantial extent of the wash solvent, into direct contact with the hot spent adsorbent to effect rapid cooling thereof to a temperature substantially below said elevated treating temperature, the adsorbent having been cooled before it reaches the columnar mass, passing the cooled adsorbent downwardly through a confined washing zone through a substantial portion of which it flows as a columnar mass of particles, passing a suitable washing solvent upwardly through said columnar mass at a temperature suitable for removing the cycle hydrocarbons from the adsorbent but below that at which it would remove excessive amounts of said undesired components from the adsorbent, withdrawing a liquid stream comprising the solvent and removed hydrocarbons from the upper section of said washing zone, subjecting at least a portion of said stream to fractionation to effect separation of the solvent from the recovered hydrocarbons to obtain a hydrocarbon recycle stock in which the percentage of the undesired components is not above that which would cause excessive decrease in treated hydrocarbon yield per unit adsorbent throughput due to the recycling of said stock, recycling said stock to the treating zone and recycling a portion of at least the solvent constituent of said liquid stream withdrawn from said washing zone into direct contact with the hot spent adsorbent to effect cooling thereof as aforesaid.

5. A continuous process for solvent washing a spent adsorbent which has become spent in use for decolorizing mineral oils at treating temperatures above the boiling point of the wash solvent and which is withdrawn from the treating zone bearing entrained oil and a contaminant deposit including color bodies and at an elevated temperature near that in said treating zone which method comprises, passing the hot spent adsorbent of palpable particulate form downwardly as a confined stream through a cooling region through which the adsorbent flows freely and injecting a cooling liquid comprised at least mostly of the wash solvent into said stream to effect cooling of the adsorbent to a temperature substantially below the boiling point of said solvent and directing the cooled adsorbent downwardly onto a columnar mass thereof in a confined washing zone, passing the adsorbent downwardly through said columnar mass while passing a suitable wash solvent upwardly therethrough to effect removal of the entrained oil, withdrawing the washed adsorbent substantially free of the entrained mineral oil but bearing the carbonaceous contaminant including color bodies, withdrawing the liquid solvent mixed with the recovered oil from the upper section of said washing zone cooling a portion of at least the solvent component of the withdrawn liquid in a zone outside of said washing zone and injecting the cooled portion of said liquid into said stream of hot spent adsorbent in said cooling region as aforesaid to effect the desired cooling of said adsorbent before it reaches said columnar mass in said washing zone.

6. A continuous process for solvent washing mineral oil from a spent adsorbent of palpable particulate form which has become spent in use for decolorizing mineral oils at treating temperatures above the boiling point of the wash solvent and which is withdrawn from the treating zone bearing cycle oil and a contaminant deposit including color bodies and at an elevated temperature near that in said treating zone which method comprises, maintaining a columnar mass of said adsorbent in a confined washing zone, passing a suitable wash solvent upwardly through said columnar mass to remove cycle oil from the adsorbent, withdrawing the mixed liquid solvent and cycle oil from the upper section of said washing zone, withdrawing washed adsorbent from the lower section of said columnar mass so as to promote downward movement of the adsorbent therein, passing the hot spent adsorbent downwardly as a free flowing confined stream of smaller cross-section than said columnar mass through a cooling region and cooling a portion of the liquid solvent and oil withdrawn from said washing zone in a zone outside of said washing zone and injecting the cooled liquid into said downwardly flowing confined stream of hot adsorbent to flow down at a temperature and rate suitable for effecting rapid cooling of the adsorbent to a temperature substantially below the boiling point of said solvent flowing the cooling liquid downwardly with the adsorbent through said cooling region and directing the cooled absorbent downwardly onto the surface of said column thereof to replenish the same.

7. A continuous process for solvent washing entrained mineral oil from spent adsorbents of palpable particulate form bearing carbonaceous deposits including color bodies removed from mineral oils treated at elevated temperatures with said adsorbent, said elevated temperatures being above the temperature at which the color bodies would redissolve in said solvent in substantial amounts which method comprises, maintaining a columnar mass of said adsorbent in a lower portion of a confined washing zone, introducing a washing solvent into the lower section of said columnar mass and passing it upwardly therethrough to wash the entrained oil from said adsorbent while leaving the carbonaceous deposit and color bodies thereon, passing the liquid solvent and removed oil upwardly from the surface of said column and into a body of the liquid maintained on top of said columnar mass and withdrawing the solvent and oil from the upper section of said liquid body, withdrawing washed adsorbent substantially free of the entrained oil from the lower section of said columnar mass so as to promote downward movement of the adsorbent therethrough, passing spent adsorbent existing initially at a temperature at which the color bodies thereon would be dissolved in excessive amounts by the solvent downwardly into at least one confined passage extending from a level above the surface of said liquid body to a level a substantial distance below the surface of said liquid body but above the surface of said columnar mass, said passage having maximum lateral dimensions substantially less than said liquid body and being open on its lower end, causing the particles to fall freely through said passage, cooling a portion of the solvent and oil withdrawn from said liquid body in a region outside of said liquid body and washing zone and injecting the cooled liquid into said confined passage to contact and cool the adsorbent to a temperature below that which more than about 50 percent by weight of the color bodies thereon would be removed by the solvent and permitting the cooled adsorbent to drop from the lower end of said passage through the portion of the liquid body therebelow and onto the surface of said columnar mass to replenish the same.

8. In a process wherein an adsorbent of palpable particulate form becomes spent in use for decolorizing mineral oils at elevated temperatures and is withdrawn from the treating zone for the purpose of washing with a suitable solvent to recover cycle oil and later regenerating the adsorbent to render it suitable for reuse and wherein the spent adsorbent bearing carbonaceous contaminant including color bodies is withdrawn from the treating zone along with substantial amounts of cycle oil at a temperature above the boiling point of the washing solvent the continuous process for washing the hot spent adsorbent which comprises, maintaining a columnar mass of said adsorbent in a lower portion of a confined washing zone, introducing a washing solvent into the lower section of said columnar mass and passing it upwardly therethrough to wash the cycle oil from said adsorbent while leaving the carbonaceous deposit and color bodies thereon, passing the liquid solvent and removed oil upwardly from the surface of said column and into a body of the liquid maintained on top of said columnar mass and withdrawing the solvent and oil from the upper section of said liquid body, withdrawing washed adsorbent substantially free of the cycle oil from the lower section of said columnar mass so as to promote downward movement of the adsorbent therethrough, passing the hot spent adsorbent from the treating zone into the upper end of at least one confined passage extending from a level above the surface of said liquid body to a level a substantial distance below the surface thereof, said passage having maximum lateral dimensions substantially less than said liquid body and being open on its lower end and vented to a region of substantially atmospheric pressure at its upper end, passing the particles in free flow downwardly through said passage, cooling a portion of the liquid withdrawn from said liquid body in a zone outside of said liquid body and said columnar mass and injecting it into the upper section of said passage to intimately contact the adsorbent and effect cooling thereof to a temperature below the boiling point of said solvent and below a level at which the solvent would remove excessive amounts of the color bodies from the adsorbent in the washing zone and delivering the cooled adsorbent from the lower end of said confined passage downwardly onto the surface of said columnar mass.

9. A continuous process for solvent washing entrained mineral oil from spent adsorbents of palpable particulate form bearing carbonaceous deposits including color bodies removed from mineral oils treated at elevated temperatures with said adsorbent, said elevated temperatures being above the temperature at which the color bodies would redissolve in said solvent in substantial amounts which method comprises, maintaining a columnar mass of said adsorbent in a lower portion of a confined washing zone, introducing a washing solvent into the lower section of said columnar mass and passing it upwardly therethrough to wash the entrained oil from said adsorbent while leaving the carbonaceous deposit and color bodies thereon, passing the liquid solvent and removed oil upwardly from the surface of said column and into a body of the liquid maintained on top of said columnar mass and withdrawing the solvent and oil from the upper section of said liquid body and subjecting the same to fractionation to separate the solvent from the oil, recycling a portion of the separated solvent to the lower section of the washing zone as washing solvent, withdrawing washed adsorbent substantially free of the entrained oil from the lower section of said columnar mass so as to promote downward movement of the adsorbent therethrough, passing spent adsorbent existing initially at a temperature at which the color bodies thereon would be dissolved in substantial amounts by the solvent downwardly into at least one confined passage extending from a level above the surface of said liquid body to a level a substantial distance below the surface of said liquid body but above the surface of said columnar mass, said passage having maximum lateral dimensions substantially less than said liquid body and being open on its lower end, passing the particles as freely falling particles downwardly through said passage and cooling the remaining portion of said separated solvent after its fractionation from the oil and introducing it into said passage to contact the adsorbent and effect cooling thereof to a temperature below that at which the solvent would dissolve substantial amounts of the color bodies from the adsorbent and directing the cooled adsorbent downwardly from the lower end of said passage onto the surface of said columnar mass to replenish the same.

10. A continuous process for solvent washing mineral oil from a spent adsorbent of palpable particulate form which has become spent in use for decolorizing mineral oils at treating temperatures above the boiling point of the wash solvent and which is withdrawn from the treating zone bearing entrained oil and a contaminant deposit including color bodies and at an elevated temperature near that in said treating zone which method comprises, passing the hot spent adsorbent downwardly as a confined stream of freely descending particles through a cooling region and injecting a cooling liquid comprised at least mostly of the wash solvent into said stream to effect cooling of the adsorbent to a temperature substantially below the boiling point of said solvent but still at a level at which the solvent would remove excessive amounts of color bodies from the adsorbent and directing the cooled adsorbent downwardly onto a columnar mass thereof in a confined washing zone, passing the adsorbent downwardly through said columnar mass while passing a suitable wash solvent upwardly therethrough to effect removal of the cycle oil while leaving the color bodies on the adsorbent, supplying said solvent to the lower section of said columnar mass at a rate and temperature controlled to effect further cooling of the adsorbent so as to maintain the temperature along columnar mass at a level at which the amount of color bodies removed from the adsorbent by the solvent is less than about 50 percent by weight of the color bodies on the adsorbent leaving the treating zone, withdrawing the washed adsorbent substantially free of the cycle mineral oil but bearing carbonceous contaminant including color bodies, withdrawing the liquid solvent mixed with the recovered oil from the upper section of said washing zone extracting heat from a portion of at least the solvent component of the withdrawn liquid outside of said washing zone and passing the cooled portion of said liquid to said cooling region as aforesaid at a temperature to effect the desired cooling of the confined stream of hot spent adsorbent.

11. In a cyclic process for treating mineral oils with adsorbents of palpable particulate form at an elevated temperature to decolorize the same, wherein the adsorbent becomes spent by deposition of color bodies and carbonaceous contaminants thereon and wherein a stream of said spent adsorbent along with some mineral oil is removed from the treating zone still at the elevated treating temperature for revivification of the adsorbent, the improved method for washing said adsorbent to recover the mineral oil so removed from the treating zone therewith with a suitable wash solvent which would vaporize to a substantial extent and remove excessive amounts of the color bodies from the adsorbent as well as the oil at said elevated treating temperature which comprises, maintaining a columnar mass of said adsorbent in a lower portion of a confined washing zone, supplying said wash solvent to a lower section of said columnar mass and passing it upwardly through said columnar mass to remove the mineral oil while leaving the carbonaceous deposits including color bodies on the adsorbent, passing the liquid upwardly from the surface of said columnar mass and into a body of the liquid maintained above said column and withdrawing the solvent and mineral oil from the upper section of said liquid body, withdrawing washed adsorbent substantially free of the mineral oil from the lower section of said columnar mass so as to promote downwardly flow of the adsorbent therethrough, supplying the spent adsorbent existing initially at said elevated temperatures downwardly as at least one confined freely flowing stream through at least an upper portion of said liquid body and dropping the adsorbent onto the surface of said adsorbent columnar mass, said confined stream being of smaller cross-section than said liquid body, extracting heat from a portion of at least the solvent component of said liquid withdrawn from said liquid body to reduce its temperature at a location outside of said liquid body and columnar mass, injecting said portion after heat abstraction into said confined stream of adsorbent at a rate and temperature controlled to effect cooling of the adsorbent before it reaches said columnar mass to a temperature below the boiling range of the solvent but still above the desired washing temperature, controlling the rate and temperature of the solvent supplied to the lower section of said columnar mass to effect a further cooling of the adsorbent as it passes through said columnar mass, whereby the temperature along said columnar mass is maintained at a level at which less than 50 percent by weight of the color bodies on the adsorbent leaving the treating zone are removed from the adsorbent by the solvent.

12. A continuous process for solvent washing mineral oil from a spent adsorbent of palpable particulate form of particle size within the range 4–100 mesh bearing carbonaceous deposits and existing at a temperature above the boiling point of the solvent which comprises, maintaining a columnar mass of said adsorbent in a lower portion of a confined washing zone, passing the solvent upwardly through said columnar mass to remove the mineral oil while leaving the carbonaceous deposits on the adsorbent, restricting the rate of said solvent flow below that which would substantially disrupt said columnar mass, passing the liquid upwardly from the surface of said columnar mass and into a body of the liquid maintained above said columnar mass and withdrawing the solvent and mineral oil entirely in the liquid phase from the upper section of said liquid body, withdrawing washed adsorbent substantially free of the mineral oil from the lower section of said columnar mass so as to promote downward flow of the adsorbent therethrough, supplying the spent adsorbent, existing initially at a temperature above the boiling point of said solvent, dowwardly through said body of liquid in heat exchange relationship therewith onto the surface of said columnar mass to effect a substantial decrease in the adsorbent temperature within said liquid body exclusively by heat exchange therewith and without other cooling and delivering the cooled adsorbent onto the surface of the columnar mass thereof to replenish the same and extracting sufficient heat from said liquid body by means of a stream of cooling fluid other than the stream of liquid passing upwardly into said body from the surface of said columnar mass to prevent boiling of the solvent, whereby it is removed from said washing zone entirely in the liquid phase.

13. A method for continuous solvent washing valuable hydrocarbon material from spent treating adsorbent bearing impurities removed from like hydrocarbon material, which adsorbent is of palpable particle form and exists at an elevated treating temperature which method comprises, maintaining a columnar mass of said adsorbent of particle size within the range 4 to 100 mesh in a lower portion of a confined washing zone, passing the solvent upwardly through said columnar mass to remove the valuable hydrocarbon material while leaving the impurities on the adsorbent, restricting the rate of flow of said solvent below that which would substantially disrupt said columnar mass, passing the liquid solvent upwardly from the surface of said columnar mass into a body thereof maintained above the columnar mass and withdrawing the solvent and valuable hydrocarbon material from the upper section of said liquid body, withdrawing washed adsorbent substantially free of the valuable hydrocarbon material from the lower section of said columnar mass so as to promote downward movement of the adsorbent therein, replenishing said columnar mass by supplying spent adsorbent downwardly through said liquid body in heat exchange relationship therewith onto the surface of said columnar mass, the adsorbent being cooled by the liquid body to a temperature at least below the boiling point of the solvent, and recyling to said liquid body separately and apart from the supply of adsorbent thereinto, a cooled portion of at least the solvent constituent of the liquid withdrawn from the upper section of said body to maintain the temperature therein below the boiling range of said solvent.

14. A continuous process for solvent washing mineral oils from an adsorbent of palpable particle form made up of particles of size within the range about 4 to 100 mesh which have become spent by deposition thereon of carbonaceous deposits including color bodies during use in treating mineral oils at elevated temperatures above those at which excessive amounts of the color bodies would redissolve in the wash solvent, which method comprises, maintaining a columnar mass of said adsorbent in a lower portion of a confined washing zone, passing the solvent upwardly through said columnar mass to remove the mineral oil, passing the liquid upwardly from the surface of said columnar mass and into a body of the liquid maintained above said columnar mass and withdrawing the solvent and mineral oil from the upper section of said liquid body, withdrawing washed adsorbent substantially free of the oil from the lower section of said columnar mass so as to promote downward flow of the adsorbent therethrough, replenishing said columnar mass by supplying the spent adsorbent existing initially at said elevated temperatures downwardly through and in cooling heat exchange relationship with said body of liquid onto the surface of said columnar mass, whereby the adsorbent reaches said columnar mass at a temperature substantially below said elevated treating temperatures, fractionating the liquid withdrawn from said body to separate the oil from the solvent, cooling the solvent, recycling a portion of the cooled solvent to the liquid body separately and apart from adsorbent supply thereinto to maintain the temperature therein below the level at which said color bodies would redissolve in the solvent in excessive amounts and supplying the remainder of the solvent to the lower section of said adsorbent columnar mass as the wash solvent.

15. The method of claim 12 in combination with the further step of cooling said columnar mass to maintain the temperature sufficiently low to prevent removal in excess of about 50 percent by weight of the color bodies from the adsorbent as it passes through the washing zone.

References Cited in the file of this patent

UNITED STATES PATENTS

| | | |
|---|---|---|
| 2,541,795 | Verley | Feb. 13, 1951 |
| 2,552,435 | Knox et al. | May 8, 1951 |
| 2,552,436 | Bennett et al. | May 8, 1951 |
| 2,571,380 | Penick | Oct. 16, 1951 |
| 2,572,433 | Bergstrom et al. | Oct. 23, 1951 |
| 2,602,044 | Lupfer et al. | July 1, 1952 |
| 2,696,305 | Slover | Dec. 7, 1954 |
| 2,696,462 | Bodkin | Dec. 7, 1954 |
| 2,701,786 | Evans et al. | Feb. 8, 1955 |